(12) United States Patent
Young et al.

(10) Patent No.: US 6,189,640 B1
(45) Date of Patent: Feb. 20, 2001

(54) DRIVE LINE SHIELD FOR ARTICULATED TRACTORS

(75) Inventors: David A. Young; Daniel Pakosh; Henry Latchman, all of Manitoba (CA)

(73) Assignee: New Holland North America, Inc., New Holland, PA (US)

( * ) Notice: Under 35 U.S.C. 154(b), the term of this patent shall be extended for 0 days.

(21) Appl. No.: 09/370,960

(22) Filed: Aug. 10, 1999

Related U.S. Application Data

(60) Provisional application No. 60/097,249, filed on Aug. 20, 1998.

(51) Int. Cl.[7] .............................. B60D 1/60; B60K 17/00
(52) U.S. Cl. .............................................. 180/235; 464/177
(58) Field of Search .................................. 180/235, 346, 180/379, 380, 383; 74/608, 609; 464/176, 172, 171, 177

(56) References Cited

U.S. PATENT DOCUMENTS

| 2,410,503 | * | 11/1946 | Johnson | 464/176 |
|---|---|---|---|---|
| 2,443,035 | * | 6/1948 | Hardy | 464/176 |
| 2,514,089 | * | 7/1950 | Punsky | 464/176 |
| 3,504,508 | * | 4/1970 | Bornzin | 464/176 |
| 3,557,892 | * | 1/1971 | Burrough . | |
| 3,797,328 | * | 3/1974 | Quirk | 74/609 |
| 4,020,913 | * | 5/1977 | Yatcilla . | |
| 4,130,998 | * | 12/1978 | Einsel et al. | 464/172 |
| 4,308,931 | | 1/1982 | Khanna | 180/235 |
| 4,403,670 | * | 9/1983 | Sammarco . | |
| 5,893,323 | * | 4/1999 | Benzi | 74/609 |

* cited by examiner

Primary Examiner—J. J. Swann
Assistant Examiner—Christopher Bottorff
(74) Attorney, Agent, or Firm—J. William Stader; Larry W. Miller

(57) ABSTRACT

The invention is a sliding shield between the cab end and engine end of a bi-directional or articulated tractor. A sliding member is pivotally attached to the flared shield support on the cab end. The sliding member has a slot on which permits it to be slideably attached to the flared end shield. There are a pair of opposing walls perpendicularly affixed to the shield member. One wall has an aperture with a removal door attached. The sliding member covers a pair of universal joints and a connecting transfer shaft. Access to a grease fitting on the transfer shaft may be gained through the door to allow lubrication.

9 Claims, 6 Drawing Sheets

DRIVE LINE SHIELD FOR ARTICULATED TRACTORS

CROSS-REFERENCE TO RELATED APPLICATIONS

This application claims domestic priority on U.S. Provisional Patent Application Serial No. 60/097,249, filed on Aug. 20, 1998.

BACKGROUND OF THE INVENTION

1. Field of Invention

This invention relates generally to four wheel drive articulated tractors and, more particularly, to improvements to provide shielding for the drive line on articulated tractors having a drive line extending across the articulation joint.

2. Background of Prior Art

On articulated tractors of the type having a two opposing ends, typically an engine end supporting the engine providing operative power for the tractor and a cab end supporting the operator's cab and gearbox mechanism, joined by an articulation joint. Steering of the tractor is accomplished by manipulating the articulation joint with hydraulic actuators. In such tractors, the operative power for the tractor is delivered from the engine to the splitter gearbox on the opposing end of the tractor via a power input drive line extending from the engine end to the cab end across the articulation joint. For an example of such an articulated tractor, please review the New Holland Bidirectional™ Tractor TV 140.

It is desirable to cover this drive line with a shielding to prevent accidental engagement with the drive line. Such a shield, however, must cover the universal joint assembly of the drive line at the articulation joint throughout the entire range of movement of the articulation joint and the corresponding movement of the drive line. Furthermore, the universal joint will change length as the articulation joint is manipulated to effect steering of the tractor.

Likewise, the shield must be operable to cover the drive line as the universal joint changes length. U.S. Pat. No. 4,308,931 discloses a drive line shield that shields the drive line in the straight ahead position, but exposes the drive line when the articulated tractor is turning. It is of paramount importance that an individual be prevented from contacting the rotating drive line universal joints when the tractor is in all positions. Frequently servicing of various tractor components is accomplished when the articulated tractor is in a turned position.

OBJECTIVES OF THE INVENTION

It is an object of the present invention to provide a drive line shield between the engine end and cab end of an articulated tractor.

It is a further object of the present invention to provide a drive line shield which pivots and extends as an articulated tractor turns.

It is a further object of the present invention to provide a drive line shield which allows access to grease fittings for periodic lubrication.

It is a further object of the present invention to provide a drive line shield covers the output shaft of the engine, the power input drive line, transfer shaft member and universal joints.

It is a further object of the present invention to provide a drive line shield that covers the drive line while the tractor is turned such as to prevent the operator from contacting the spinning drive line.

SUMMARY OF THE INVENTION

The present invention solves the problems with the prior art. The invention consists of a sliding shield member extending between the cab end and engine end of an articulated tractor. The sliding shield member is pivotally attached to the flared shield support on the cab end. The sliding shield member has a slot which is slideably and pivotally attached to the flared end shield on the engine end. Alternatively, the slot may be positioned on the flared end shield and pivotally attached to the sliding shield member. The sliding member has a pair of opposing walls perpendicularly affixed thereon. One wall has an aperture with a removable door attached. The sliding member covers a pair of universal joints and connecting transfer shaft. Access to a grease fitting on transfer shaft may be gained through the door to allow lubrication.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
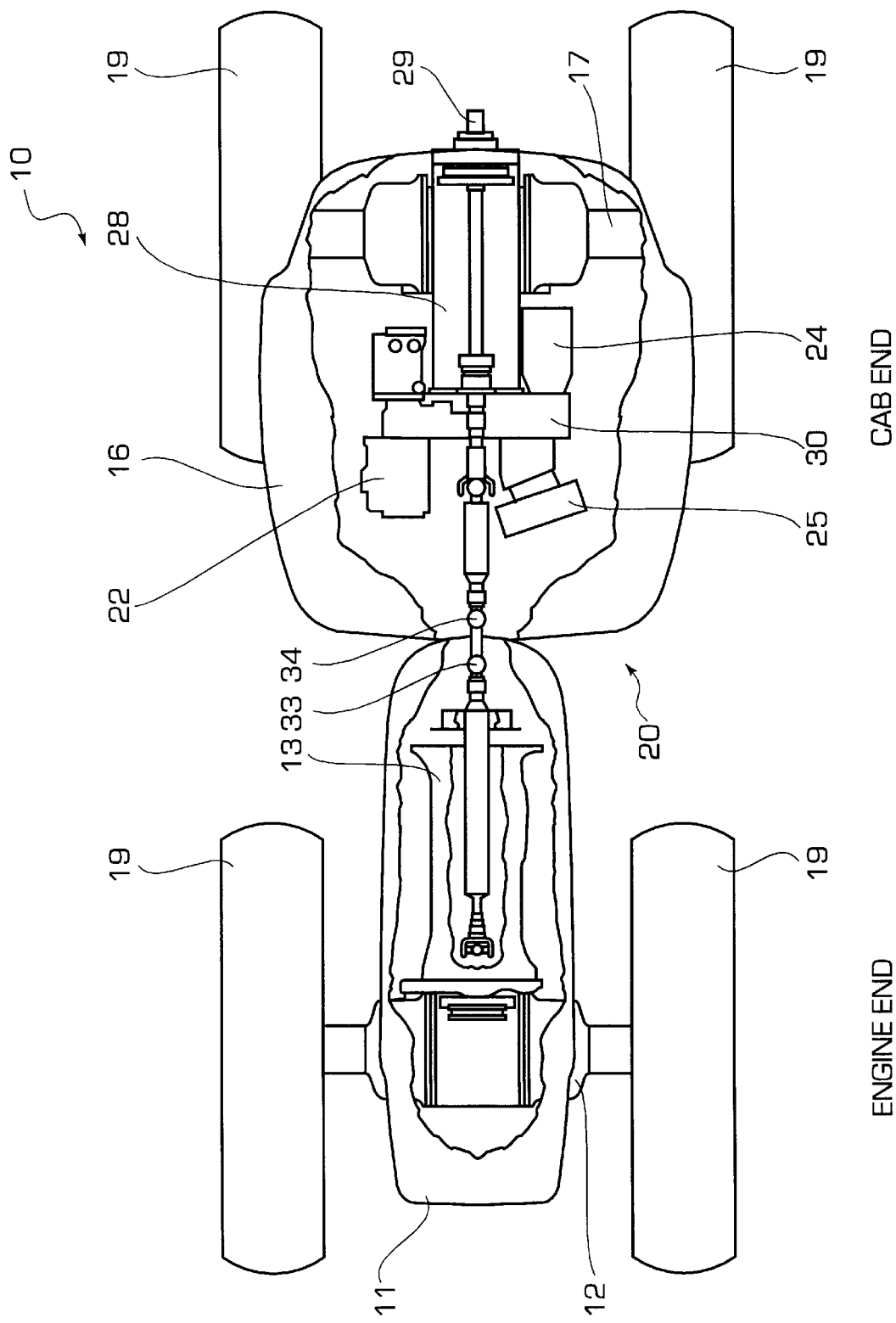
FIG. 1 is a schematic top plan view of an articulated tractor incorporating the principles of the instant invention.
Figure 2:
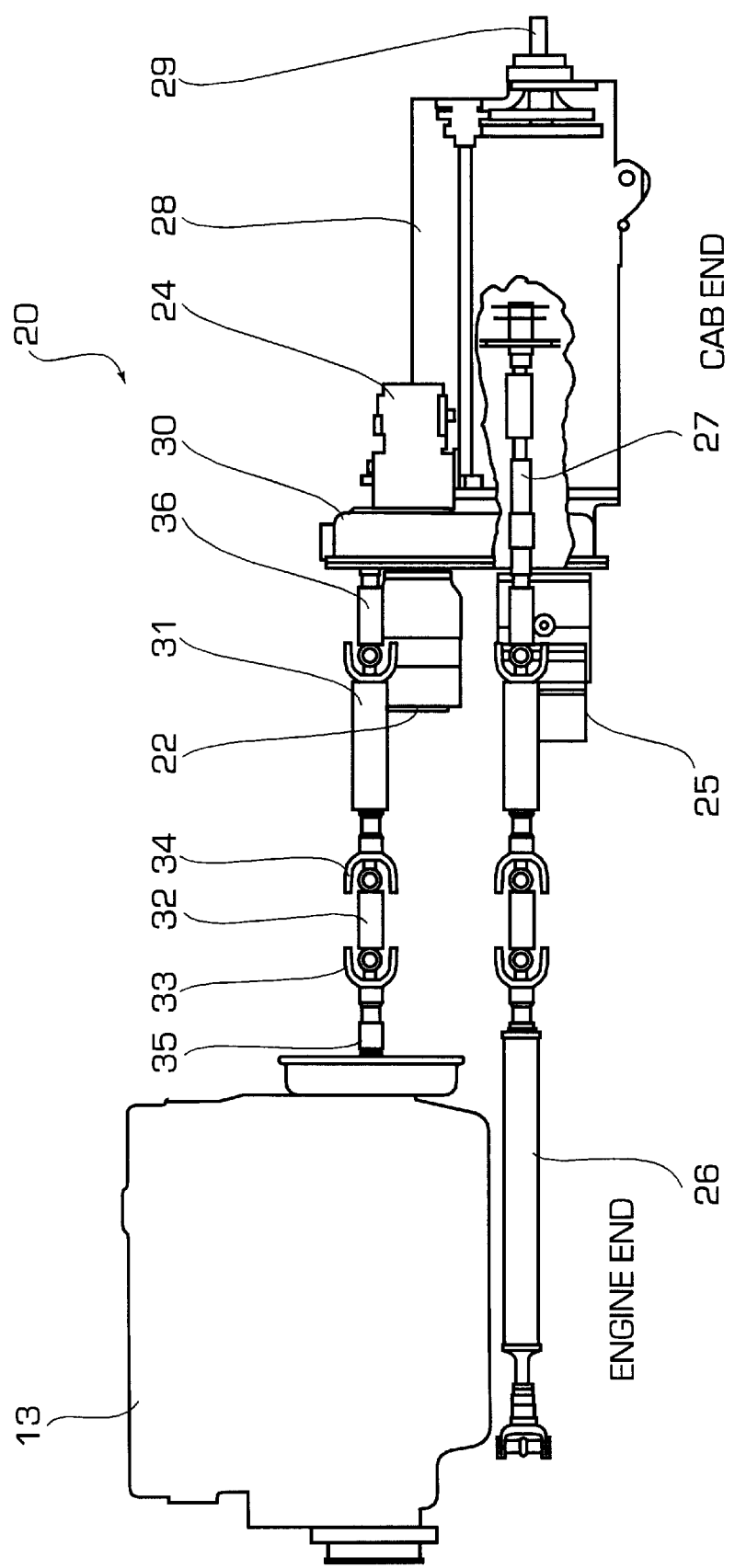
FIG. 2 is a schematic side elevational view of the articulated tractor showing the driveline and driveline shield.

Referring now to FIGS. 1 and 2, a four wheel drive, articulated tractor incorporating the principles of the instant invention can best be seen. The articulated tractor 10 includes a forward engine end 11 supported above the ground by a front axle assembly 12 and carrying an engine 13. The rearward cab end 16 of the tractor 10 is supported above the ground by a rear axle assembly 17 and has an operator's station mounted thereon. Each of the front and rear axle assemblies 12, 17 is provided with a pair of opposing wheels 19 for mobile movement of the tractor 10 over the surface of the ground. The front and rear ends 11, 16 of the tractor 10 are connected by an articulation joint 15, the manipulation of which effects steering of the tractor 10 in a known manner.

Figure 3:
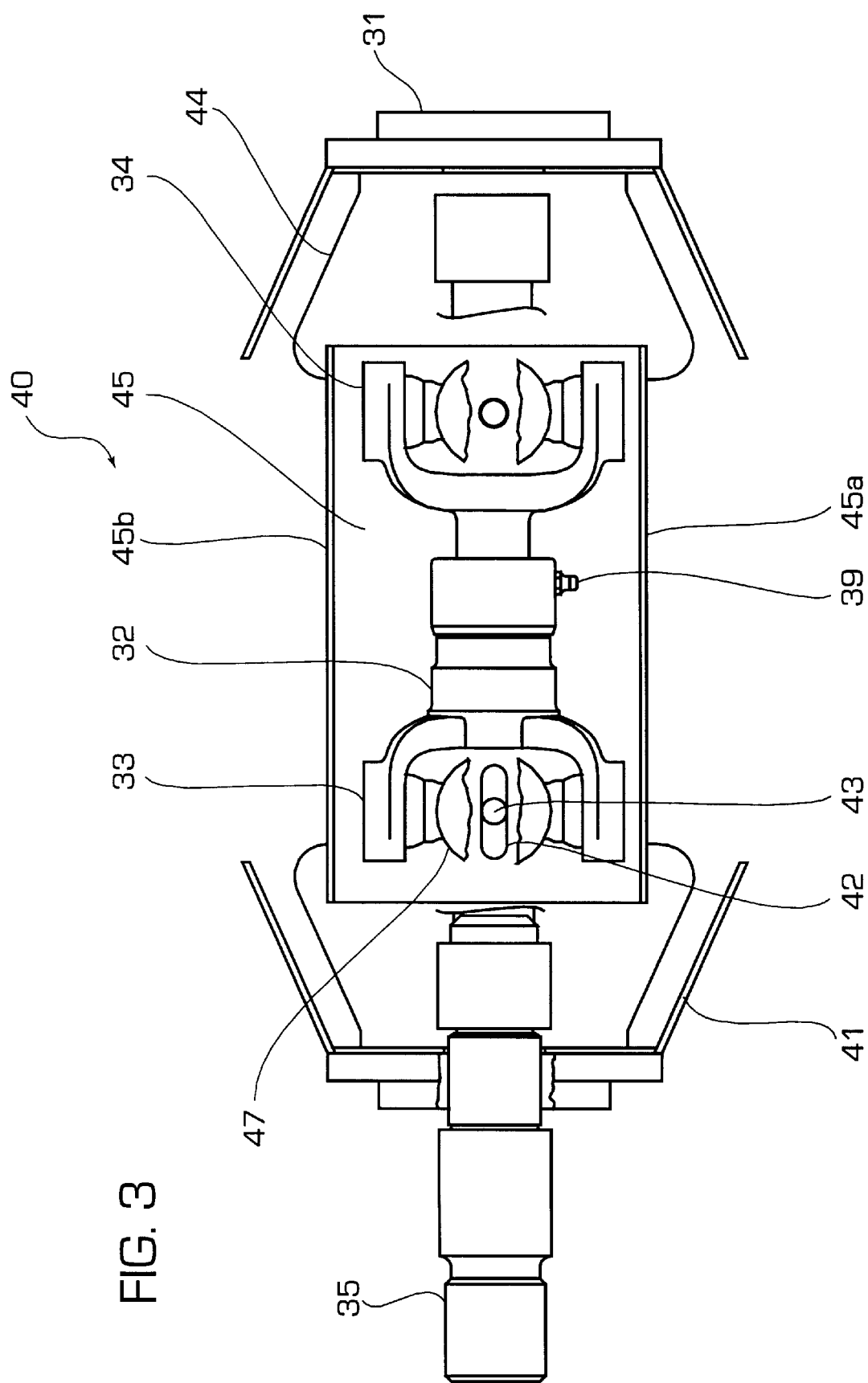
FIG. 3 is an enlarged schematic top plan view of the shield with the tractor in a straight ahead orientation.

As best seen in FIGS. 1–3, the tractor 10 is provided with a drive system 20 that is operatively connected to the engine 13 to provide operative power for the front and rear axle assemblies 12, 17. The drive system 20 includes a splitter gearbox 30 mounted on the front of the rear axle assembly 17 in a manner to share the oil sump therewith for lubrication purposes. The drive system 20 also includes the input drive components, including a hydrostatic pump 22 for powering the traction drive of the tractor 10, a hydraulic pump 24 for pressuring the hydraulic system of the tractor 10, and a power takeoff (PTO) mechanism 29; and the output drive components, including a hydrostatic motor 25 to provide operative power to both the front and rear axle assemblies 12, 17 through front and rear output drive shafts 26, 27.

The front axle assembly 12 is drivingly connected to the splitter gearbox by the front output drive shaft 26. Similarly, the rear axle assembly 17 is drivingly connected to the splitter gearbox 30 by a rear output drive shaft 27 passing internally through the housing 28 of the rear axle assembly. Likewise, the PTO mechanism 29 is driven from the splitter gearbox 30 and passes through the housing 28 of the rear axle assembly 17 and projects rearwardly therefrom for remote connection to an apparatus (not shown) for delivering rotational power thereto.

Accordingly, the top portion of the splitter gearbox 30 receives rotational power directly from the engine 13 and drives the input drive train components, including the hydrostatic pump 22, the hydraulic pump 24 and the PTO mechanism 29. The lower portion of the splitter gearbox 30 receives operative power from the hydrostatic motor 25 operatively driven from the hydrostatic pump 22 and delivers the rotational power through the output shafts 26, 27 to drive the front and rear axle assemblies 12, 17 from a single hydrostatic motor 25.

The splitter gearbox 30 receives rotational power from the engine 13 via a power input drive line 31 interconnecting the engine 13 and the splitter gearbox 30 and spanning the articulation joint 15. The power input drive line 31 includes a telescopic transfer shaft member 32 having universal joints 33, 34 at the fore-and-aft ends thereof to join the output shaft 35 of the engine 13 and the input shaft 36 of the splitter gearbox 30. The transfer shaft member 32 is centered over the articulation joint 15 to evenly divide the bend angles of the two opposing universal joints 33, 34.

Figure 4:
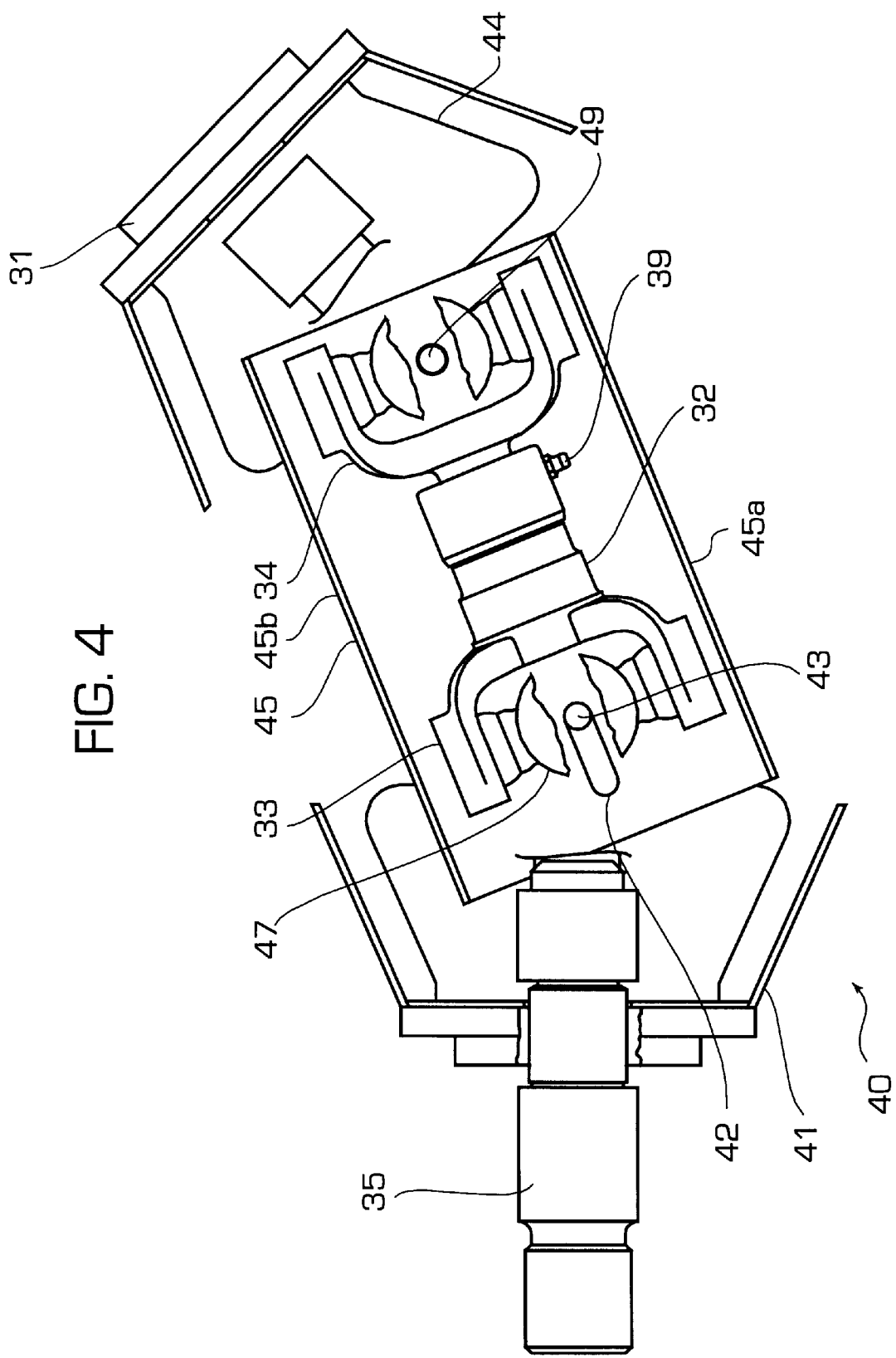
FIG. 4 is an enlarged schematic top plan view of the shield with the articulation joint bent through approximately 45 degrees to effect a turn of the tractor.

To guard the universal joint 33, a shield assembly 40 is provided, including a flared end shield 41 mounted on the output shaft 35 adjacent the universal joint 33. Similarly, the power input drive line is provided with a flared shield support 44 adjacent the opposing universal joint 34. Both the flared end shield 41 and the flared shield support 44 permit rotation of the drive line member 35, 31 on which it is mounted, but is otherwise stationary on the respective drive line member 35, 31. To shield the transfer shaft member 32 and both universal joints 33, 34, a sliding shield member 45 surrounds the transfer shaft 32 and is slidably attached to both the flared end shield 41 and the flared shield support 44. The flared end shield 41 is designed to prevent access to the drive line when the tractor is in the straight ahead position as seen in FIG. 3 or when the tractor is turning as seen in FIG. 4.

Figure 5:
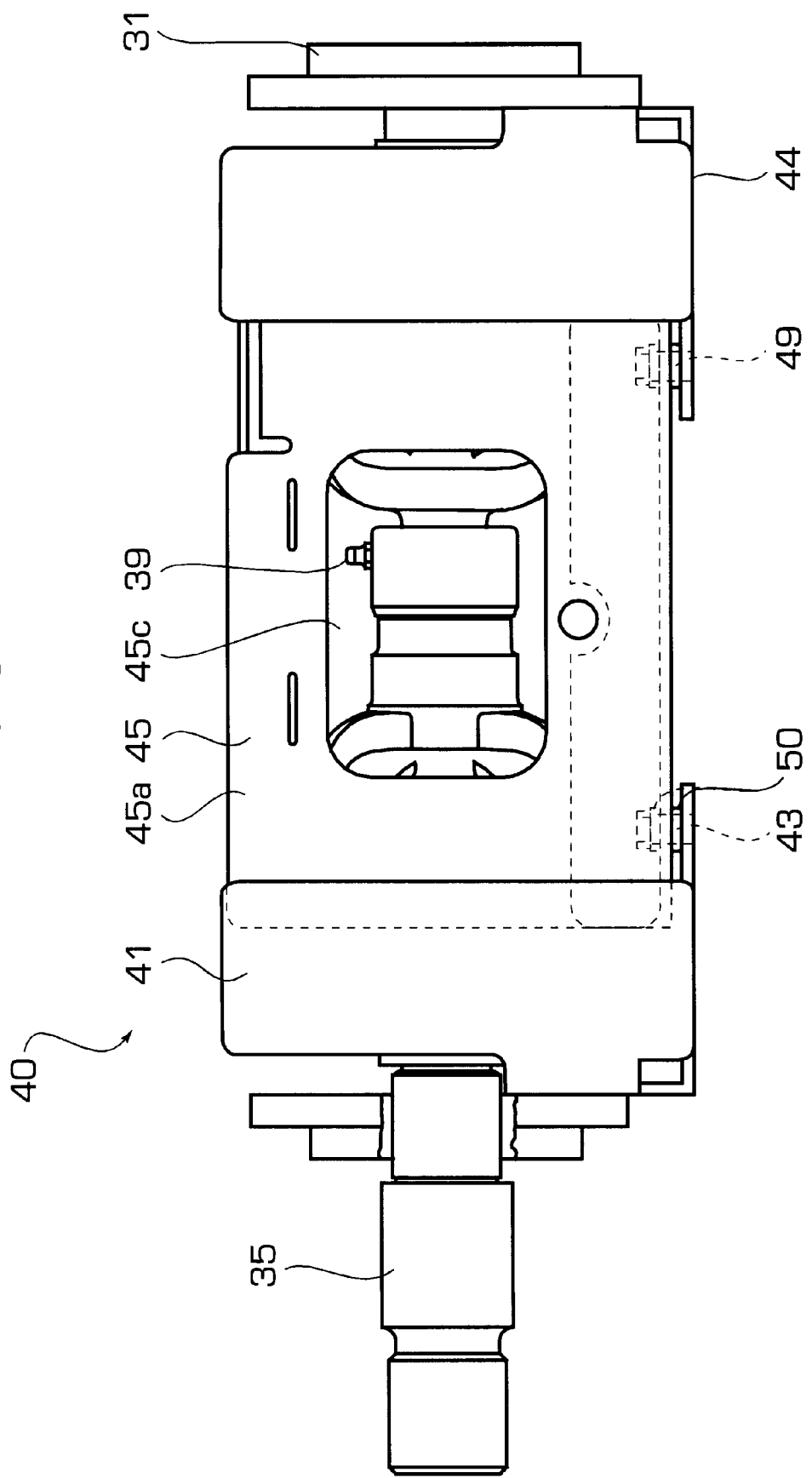
FIG. 5 is an enlarged side view of the shield without the removable door present.
Figure 6:
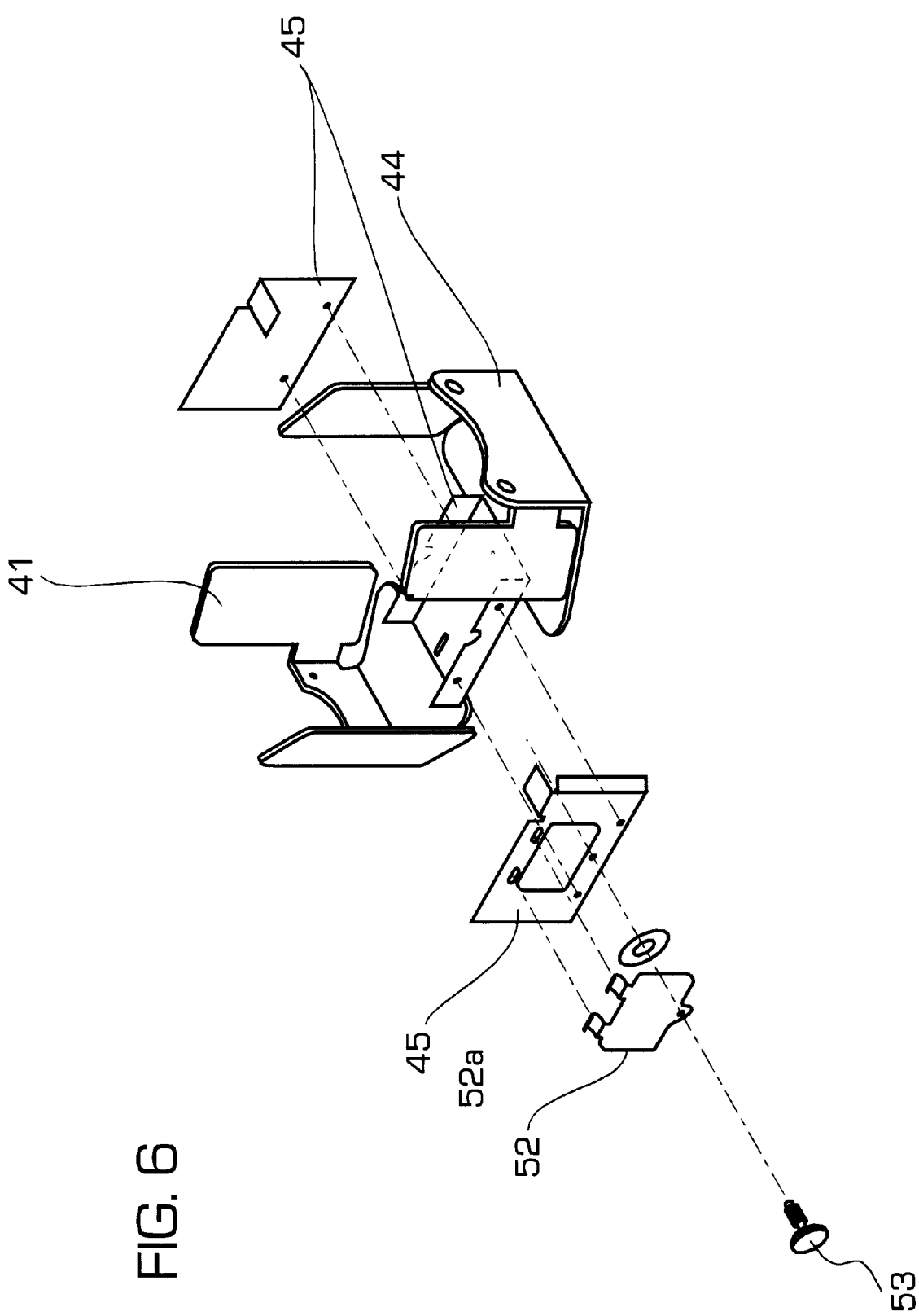
FIG. 6 is an exploded view of the drive line shield shown in FIGS. 2–5.

At the flared end shield 41, the sliding shield member 45 is connected at the center (cross member) 47 of the universal joint 33. A slot 42 formed in the flared end shield 41 allows for axial movement of the sliding shield member 45 relative to the flared end shield 41 to accommodate the lengthening of the telescopic transfer shaft member 32. Alternately, the slot 42 can be located in the sliding shield member 45. As demonstrated in FIG. 5, as compared to FIG. 4, the pin connection 43 of the sliding shield member 45 to the flared end shield 41 moves within the slot 42. At the opposing end of the sliding shield member 45, the sliding shield member 45 is attached by a pivot bolt 49 to the flared shield support 44.

To facilitate the sliding and pivoting movement of the sliding shield member 45 relative to both the flared end shield 41 and the flared shield support 44, the pivotal movement of the sliding shield member 45 about the pivot bolt 49 also effecting sliding movement therebetween, as well as the pin 43 at the slotted opening 42, which also provides a pivoting movement, nylon washers 50 are provided around the pin 43 and the pivot bolt 49. The nylon washers 50 also improve wear characteristics at the joints defined by the pin 43 and the pivot bolt 49. Affixed perpendicularly to the sliding shield member 45 are a pair of walls 45a and 45b. One of the walls 45b has an aperture 45c. Covering the aperture 45c a removable door 52 to permit convenient access to the grease fitting 39 of the transfer shaft member 32. A latch member 53 with threads 53A keeps the door 52 in a closed position during operation. The door 52 has a pair of 'C' shaped hinges to allow the door 52 to both pivot and be removed.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. An articulated tractor comprising:
   a. an engine end having an engine said engine rotating an output shaft, the output shaft connected to a U joint, said engine end having a flared end shield;
   b. a cab end having a power input drive line connected to the U joint; and
   c. a shield member slideably connected to said flared end shield and said shield member pivotally connected to a flared shield support, said flared shield support affixed to the cab end, the shield member further comprises a pair of opposing walls, each wall perpendicularly affixed to the shield member, wherein the said walls further comprise a door rotationally attached to said wall, said wall having an aperture, therein, said door covering said aperture.

2. The articulated tractor described in claim 1 wherein the door further comprises a 'C'-shaped hinge allowing the removal of said door from the wall.

3. The articulated tractor described in claim 2 further comprising:
   a. an engine side universal joint, the output shaft attached to the engine side universal joint;
   b. a cab side universal joint, the power input drive line attached to the cab side universal joint; and
   c. a transfer shaft member slideably connected between the cab side universal joint and engine side universal joint.

4. The articulated tractor described in claim 3 wherein said transfer shaft member further comprises a grease fitting on the transfer shaft member, said fitting aligned with the aperture.

5. The articulated tractor described in claim 4, wherein said shield member has a slot, therein, said slot receives a pivot pin, said pin attached to the flared end shield, whereby said shield member slides relative to the flared end shield.

6. In an agricultural tractor, said tractor having an engine end and a cab end, said engine end and cab end connected by an articulation joint, the engine end having an engine and a front axle, said axle supported by two wheels, the cab end having a cab and a rear axle, said rear axle supporting two wheels, said tractor having a drive system having an input drive system and an output drive system, said input drive system further comprising a splitter gear box mounted on the rear axle, a hydrostatic pump, a hydraulic pump and a power take off mechanism, said output drive system further comprising a hydrostatic motor operably connected to the wheels, the improvement comprising:

a. said engine having an output shaft pivotally connected to a engine side universal joint;
  b. a power input drive line pivotally connected to a cab side universal joint;
  c. a transfer shaft member pivotally connected to the cab side universal joint and engine side universal joint;
  d. a flared end shield affixed to the engine end;
  e. a flared shield support affixed to the cab end; and
  f. a sliding shield member pivotally attached to the flared shield support and slideably attached to the flared end shield, wherein said sliding shield member further comprises:
   i. a pair of opposing walls, each wall affixed to the shield member;
   ii. one wall having an aperture, therein, said aperture aligned with the transfer shaft member; and
   iii. a door having a pair of 'C' shaped hinges, said door being pivotally attached to the wall so as to cover said aperture.

7. The improvement described in claim 6, wherein said shield member further comprises a slot, therein, said slot receives a pivot pin, said pin attached to the flared end shield, whereby said shield member slides relative to the flared end shield.

8. The improvement described in claim 7, wherein said transfer shaft member further comprises a grease fitting on the transfer shaft member, said fitting aligned with the aperture.

9. The improvement described in claim 8, wherein the cab end and engine end has a range of motion in the range of 0 to 45 degrees.

\* \* \* \* \*